United States Patent [19]
Huff

[11] Patent Number: 5,692,951
[45] Date of Patent: Dec. 2, 1997

[54] HYDRAULIC STUNNER APPARATUS

[75] Inventor: Bernard G. Huff, Mission Hills, Kans.

[73] Assignee: Hantover, Inc., Kansas City, Mo.

[21] Appl. No.: 598,726

[22] Filed: Feb. 8, 1996

[51] Int. Cl.$^6$ ................................................. A22B 3/00
[52] U.S. Cl. .................................. 452/62; 452/57
[58] Field of Search ........................ 452/62, 57, 60, 452/50

[56] References Cited

U.S. PATENT DOCUMENTS

| | | | |
|---|---|---|---|
| 910,775 | 1/1909 | Bergh | 452/62 |
| 1,655,671 | 1/1928 | Watkins | 452/62 |
| 3,127,836 | 4/1964 | Silva . | |
| 3,579,889 | 5/1971 | Pallich . | |
| 3,991,650 | 11/1976 | Garland et al. . | |
| 4,219,905 | 9/1980 | Thacker et al. . | |
| 4,280,248 | 7/1981 | Herubel | 452/62 |
| 4,503,585 | 3/1985 | Hamel et al. . | |
| 4,575,900 | 3/1986 | Hamel et al. . | |
| 4,691,264 | 9/1987 | Schaffhauser et al. . | |
| 4,757,627 | 7/1988 | Saligari | 452/57 |
| 5,112,271 | 5/1992 | Howard et al. . | |

FOREIGN PATENT DOCUMENTS

| | | | |
|---|---|---|---|
| 317955 | 10/1902 | France | 452/57 |

Primary Examiner—Willis Little
Attorney, Agent, or Firm—Hovey, Williams, Timmons & Collins

[57] ABSTRACT

A hydraulic stunner apparatus for use in slaughtering animals includes a housing that defines a cylinder within which a rear seat is disposed. An elongated stunner element is received in and closes off the front end of the cylinder. The stunner element is movable between a cocked position in which the first end of the element is sealed against the seat, and a fired position in which the first end of the element is unseated and the stunner element is extended relative to the cylinder. Hydraulic fluid under pressure is directed into the cylinder to pressurize the cylinder, and an actuator is provided for unseating the stunner element from the cocked position to initiate movement of the element to the fired position. Preferably, the apparatus also includes a compressible biasing assembly for maintaining the hydraulic pressure within the cylinder upon separation of the stunner element from the seat and movement of the stunner element toward the extended position. The biasing assembly is compressed by the hydraulic fluid directed into the cylinder and occupies a volume of the cylinder that is variable as the biasing assembly is compressed. The change in the volume occupied by the biasing assembly is substantially equal to the volume within the cylinder that is occupied by the stunner element in the cocked position so that the pressure of the hydraulic fluid in the cylinder is maintained on the stunner element as the element is moved to the fired position.

11 Claims, 4 Drawing Sheets

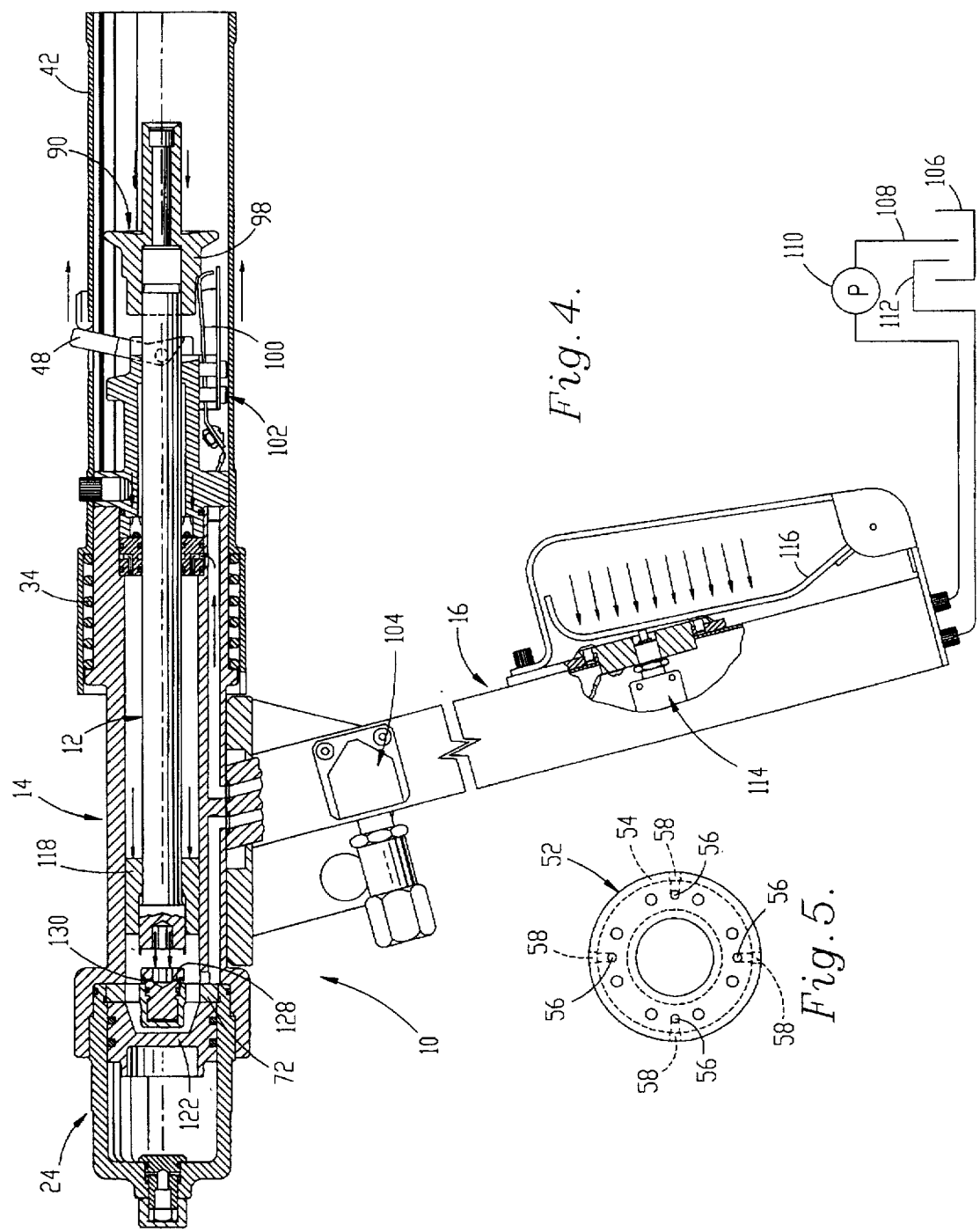

5,692,951

HYDRAULIC STUNNER APPARATUS

BACKGROUND OF THE INVENTION

1. Field of the Invention

The present invention relates to a hydraulic stunner apparatus for use in slaughtering animals.

2. Discussion of the Prior Art

In a slaughterhouse, livestock such as cattle are slaughtered and butchered, and the process used to slaughter the livestock must be humane and comply with governmental and/or religious regulations.

It is known to employ a stunner apparatus for this purpose, wherein the stunner apparatus includes a stunner element that reciprocates between cocked and fired positions, and a mechanism for driving such reciprocation. An example of a known stunner apparatus is disclosed in U.S. Pat. Nos. 4,503,585 and 4,575,900, to Hamel et al., and employs pneumatic pressure to cock and fire a stunner element.

The known pneumatic stunner apparatus includes a housing defining a cylinder within which the stunner element is received, and an actuating means for firing the element once the apparatus has been properly positioned against the head of an animal to be slaughtered. A pump provides pneumatic pressure to the apparatus, and valves are provided on the housing for controlling the flow of pressurized air into and out of each end of the cylinder to cock and fire the element when actuated.

A first valve is provided in a nose piece that is supported on the housing for axially shiftable movement between extended and retracted positions. When the apparatus is placed against the head of an animal, the nose piece is depressed, opening the valve to permit firing of the element. A second valve is provided in a handle of the housing, and a trigger is supported on the handle for moving the second valve between non-actuated and actuated positions. In order to actuate firing of the element, the nose piece must be pressed to the retracted position at the same time that the trigger is depressed.

Numerous problems arise in the use of the noted prior art pneumatic stunner apparatuses. For example, it is expensive to maintain an apparatus that uses pneumatic pressure to obtain an explosive actuation of a stunner element, and the seal rings and other pneumatic sealing structure must be frequently replaced. In addition, in such prior art devices, a dampening member must be used within the housing for stopping the stunner element each time it is fired, and this dampening member must also be replaced often.

Another common problem experienced in conventional apparatuses is that they do not have enough power to consistently deliver a concussive force sufficient to completely anesthetize the animal upon impact of the element with the skull of the animal, and require additional means for achieving such anesthetization. For example, as disclosed in U.S. Pat. No. 4,503,585, the stunning element is hollow and communicates with a pair of radial apertures located at the distal tip of the element so that when the stunning element projects through the skull of the animal and into the brain, air is expelled into the skull. The combination of the concussion and the air immediately kills the animal.

In accordance with certain religious customs, beef must be slaughtered without penetrating the skulls of the animals, rendering the noted stunner apparatus unsuitable. Thus, butchers slaughtering animals in accordance with such customs must use less refined means to deliver a concussive kill absent a powered apparatus capable of consistently delivering such forces. One such means that butchers have used for many years is a sledge hammer that they swing against the skull of the animal. This requires great skill in order to avoid inhumane treatment of the animals.

OBJECTS AND SUMMARY OF THE INVENTION

It is an object of the present invention to provide a hydraulic stunner apparatus that is easy to use, humane, and requires less service than conventional prior art devices.

It is another object of the present invention to provide a hydraulic stunner apparatus that employs hydraulic pressure to deliver a concussive force of greater power than conventional devices so that it is possible to slaughter an animal with a single concussive force without penetrating the skull and without the use of additional anesthetizing means.

In accordance with these and other objects evident from the following description of a preferred embodiment of the invention, a hydraulic stunner apparatus includes a housing defining a cylinder having a first closed end and a second open end, and an elongated stunner element received in and closing off the open end of the cylinder. The stunner element includes a first end disposed within the cylinder and an opposed second end disposed outside the open end of the cylinder. The stunner element is movable between a cocked position in which the first end of the element is sealed against a seat of the housing, and a fired position in which the first end of the element is unseated and the stunner element is extended relative to the cylinder.

The stunner apparatus also includes a pump means for directing hydraulic fluid into the cylinder to pressurize the cylinder, and an actuating means for unseating the stunner element from the cocked position to initiate movement of the element to the fired position. The stunner element, when removed from the seat, is forced to the fired position by hydraulic pressure acting on the first end of the element.

Preferably, the stunner apparatus includes a compressible biasing means for maintaining the hydraulic pressure within the cylinder upon separation of the stunner element from the seat and movement of the stunner element toward the extended position. The biasing means is compressed by the hydraulic fluid directed into the cylinder by the pump means. The biasing means occupies a volume of the cylinder that is variable as the biasing means is compressed, the change in the volume occupied by the biasing means being substantially equal to the volume within the cylinder that is occupied by the stunner element in the cocked position so that the pressure of the hydraulic fluid in the cylinder is maintained on the stunner element as the element is moved to the fired position.

By providing a stunner apparatus in accordance with the present invention, numerous advantages are realized. For example, by providing a stunner apparatus that is powered by hydraulic means as opposed to pneumatic means, higher pressures are developed and more power is delivered to the stunner element so that it is possible to obtain a concussive kill of an animal, if desired, without penetrating the skull of the animal. In addition, because the apparatus is powered by hydraulic fluid, it is self-lubricating, requiring less service than a comparable pneumatic apparatus, and having a longer useful life.

BRIEF DESCRIPTION OF THE DRAWING FIGURES

The preferred embodiment of the present invention is described in detail below with reference to the attached drawing figures, wherein:

FIG. 4 is a fragmentary side elevational view, partly in section, of the stunner apparatus, illustrating the stunner element during movement of the element toward the cocked position; and FIG. 5 is an end elevational view of an annular plug forming a part of the apparatus.

DETAILED DESCRIPTION OF THE PREFERRED EMBODIMENT

Figure 1:
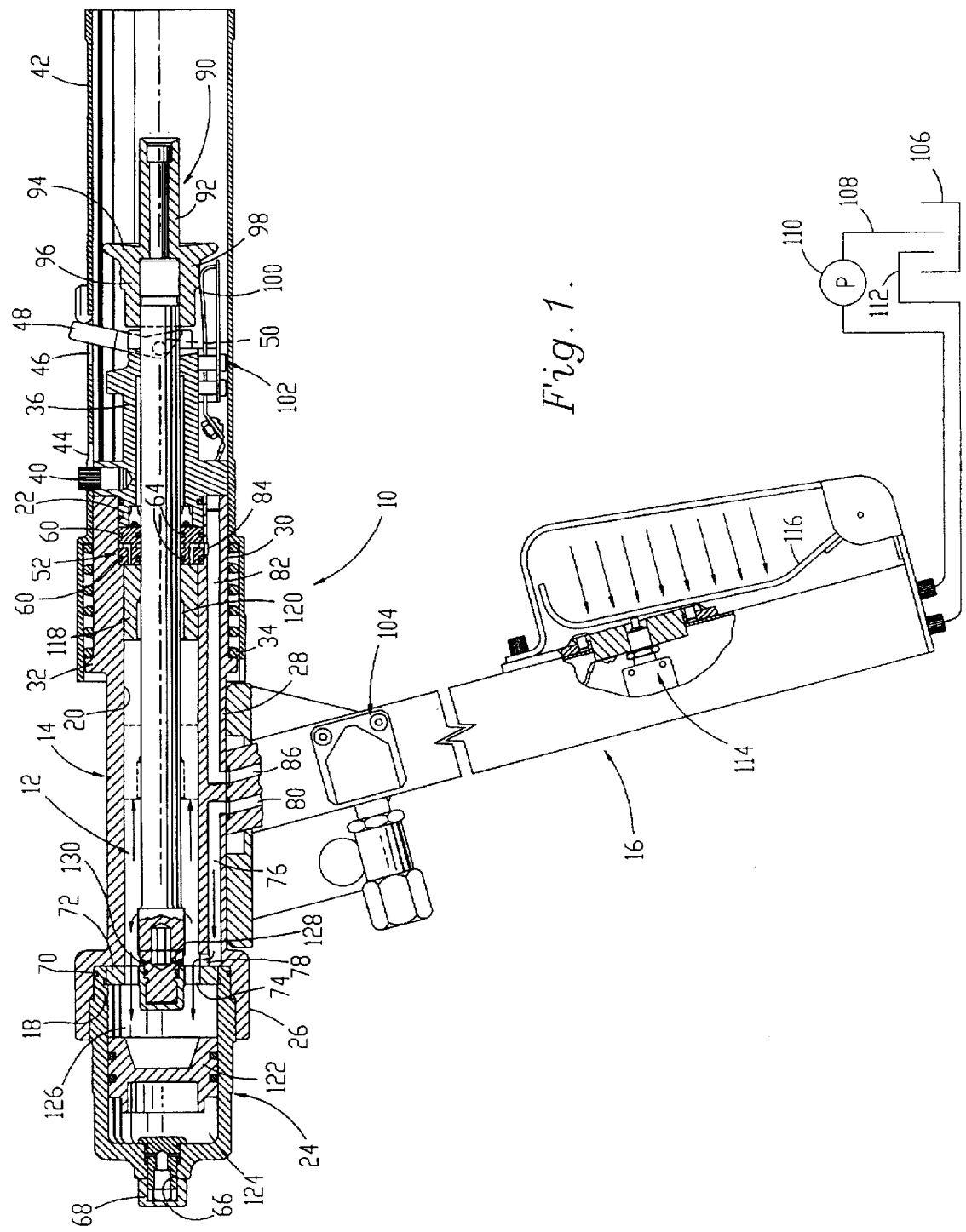
FIG. 1 is a fragmentary side elevational view, partly in section, of the stunner apparatus of the preferred embodiment, illustrating a stunner element of the apparatus in a cocked position.

A hydraulic stunner apparatus constructed in accordance with the preferred embodiment is illustrated in FIG. 1, and broadly includes a housing 10, a stunner element 12 received in the housing for reciprocating movement between cocked and fired positions, a hydraulic fluid handling system for directing hydraulic fluid to the housing to drive reciprocation of the stunner element, and an actuating means for initiating firing of the stunner element. In addition, a compressible biasing means is provided for maintaining hydraulic pressure within the housing during firing of the stunner element.

The housing 10 includes an elongated tubular cylinder 14 and a handle 16 secured to the bottom side of the cylinder and extending perpendicular thereto for permitting handling of the apparatus. Preferably, an eyelet is secured to the top side of the cylinder by Which the apparatus may be suspended on a spring-loaded retractable cable or the like from the ceiling of a slaughterhouse so that the user does not have to support the full weight of the apparatus and can guide it into position against the skull of an animal to be slaughtered and fire it. The cylinder 14 is open at each end and includes an interior surface that is divided into three stepped regions 18, 20, 22. The first region 18 at the rear end of the cylinder is a relatively large diameter region within which an end cap 24 is received for closing off the rear end of the cylinder. The second region 20 is a relatively small diameter region that extends along the intermediate length of the cylinder. The third stepped region 22 is provided at the front end of the cylinder and is of a diameter slightly larger than the diameter of the intermediate region.

The outer surface of the cylinder is also stepped, and includes an enlarged rear end section 26, a reduced diameter intermediate section 28, and a front end section 30 of a diameter slightly larger than that of the intermediate section. A circumferential ridge 32 separates the front end section 30 from the intermediate section 28 and defines a spring seat for a coil compression spring 34 as described more fully below.

An end piece 36 is secured within the front end of the cylinder and closes off the cylinder except for a central, axially extending bore within which the stunner element 12 is received. Annular seals 38 are provided between the end piece and the cylinder 14, and between the end piece and the stunner element 12 for sealing the front end of the cylinder so that the stunner element may be reciprocated without hydraulic fluid leaking from the front end of the housing. A pin 40 extends radially from the end piece and is secured in place for guiding axial shifting movement of a nose element 42 that is received over the front end of the cylinder.

The nose element 42 is tubular in shape, and includes a rear end that is of an enlarged diameter sized for receipt over the circumferential ridge 32 of the cylinder to receive the spring 34. Thus, the spring biases the nose element forward toward a position in which the element is extended relative to the cylinder. The front end of the nose element 42 extends beyond the tip of the cocked stunner element regardless of the position of the nose element relative to the cylinder. Thus, when the apparatus is cocked, it is possible to move the nose element between the extended and retracted positions by pressing the apparatus against the head of an animal to be slaughtered. A first slot 44 is formed in the nose element in alignment with the pin 40 so that axial shifting movement of the element is guided by the pin. A second slot 46 is formed in the nose element for receiving the upper end of a lever 48 that is supported on the end piece for pivotal movement about a horizontal axis extending in a direction perpendicular to the longitudinal axis of the stunner element. The lever 48 includes a pair of laterally spaced lower shoulders 50 that are adapted to engage the stunner element and shift the element forward toward the extended position when the nose piece is pressed against the skull of an animal and retracted relative to the apparatus against the bias of the spring 34.

An annular plug 52 is supported within the front end region 22 of the cylinder and is secured in place between the end piece 36 and the shoulder defined by the intermediate region 20 of the cylinder 14. The annular plug, as shown in FIG. 5, includes an outer circumferential surface formed with a circumferential channel 54 that extends completely around the plug. Four axially extending passages 56 extend into the plug from the rear end surface thereof, and communicate with the channel via four radially extending passages 58. As shown in FIG. 1, a pair of annular seals 60 are provided between the plug and the cylinder, each opposing the other relative to the circumferential channel. The seals 60 prevent hydraulic fluid delivered to the plug from leaking from the channel along the outer circumferential surface of the plug.

Returning to FIG. 5, the annular plug also includes an inner circumferential surface provided with a circumferential channel 62 that extends completely around the plug. The inner surface is of a diameter slightly greater than the diameter of the stunner element so that the stunner element is received in the plug for reciprocating movement. The channel 62 receives and stores hydraulic fluid during operation of the apparatus and lubricates the stunner element to prevent wear. With reference to FIG. 1, a pair of annular seals 64 are provided between the plug and the stunner element for sealing the space between the plug and element to prevent excessive leakage of hydraulic fluid.

The end cap 24 at the rear end of the cylinder forms a part of the compressible biasing means for maintaining hydraulic pressure within the housing during firing of the stunner element. The end cap is cup-shaped, inch a cylindrical side wall, an open front end received in the first stepped region 18 of the cylinder and communicating with the interior of the cylinder, and a closed rear end. An orifice 66 can be formed in the rear end of the cap for permitting charging of the biasing means, and a closure member 68 is used to seal the orifice during normal use of the apparatus. An annular seal 70 is provided between the front end of the end cap and the cylinder for sealing the rear end of the cylinder against leakage of hydraulic fluid.

Figure 3:
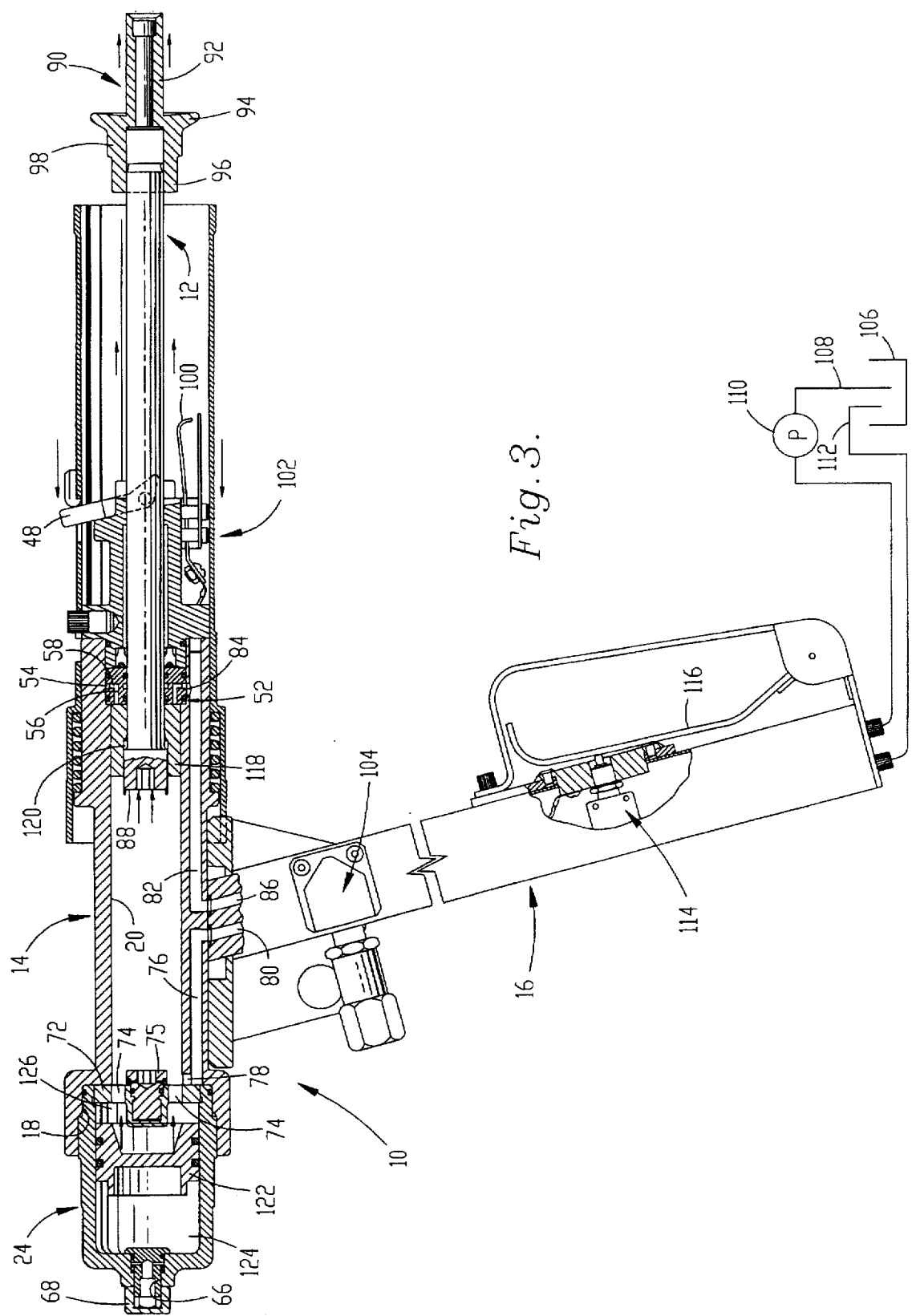
FIG. 3 is a fragmentary side elevational view, partly in section, of the stunner apparatus, illustrating the stunner element in the fired position.

As shown in FIG. 3, a circular hub 72 is supported within the rear end region 18 of the cylinder and is secured in place between the end cap 24 and the shoulder defined by the intermediate region 20 of the cylinder. The hub includes a plurality of axially extending passages 74 for permitting hydraulic fluid to pass freely through the hub between the cylinder and the end cap, and a central hub presenting a circular seat 75 facing the front end of the cylinder. The seat includes a center point that is coaxial with the longitudinal axis of the stunner element.

The cylinder includes a rear fluid passage 76 extending axially through the cylinder between the inner and outer surfaces. A first end of the passage communicates with the interior of the cylinder through an orifice 78 adjacent the hub, and a second end of the passage communicates with a first passage 80 provided in the handle 16. A front fluid passage 82 also extends axially through the cylinder between the inner and outer surfaces, and is disposed forward of the rear passage. The front passage communicates with the interior of the cylinder through an orifice 84 aligned with the channel 54 in the outer surface of the plug, and with a second passage 86 provided in the handle.

The stunner element 12 consists of an elongated cylindrical rod having opposed front and rear axial ends. The rear axial end includes an enlarged diameter and presents a rear-facing, cup-shaped seat 88 having a shape that sealingly engages the seat 75 of the hub when the stunner element is in the retracted position shown in FIG. 1. When the seat of the stunner element is sealed against the seat of the hub, hydraulic fluid is not allowed to press against the seat. However, when the stunner element is pulled from the hub, unsealing the seats from one another, hydraulic fluid enters the space between the seats and presses against the end of the stunner element to push the stunner element to the extended position.

A skull-penetrating tip 90 is supported on the stunner element at the front end and includes a forward section 92 adapted to penetrate the skull of an animal when the apparatus is placed against the skull and fired. A flange 94 is provided behind the forward section for limiting penetration of the tip into the skull and for delivering a concussive impact to the skull. If desired, the illustrated tip can be replaced with a concussive tip that does not have a skull-penetrating section, but rather presents a large, flat impact surface that delivers a concussive force to the skull of an animal without penetrating the skull. Other tip constructions could also be substituted, depending upon the application in which the apparatus is to be used. The tip also presents a rear section 96 defining an end face adapted for engagement by the shoulders of the lever when the lever is pivoted upon retraction of the nose piece. Thus, a mechanical actuating means is defined for unseating the stunner element from the cocked position to initiate movement of the element to the fired position.

A stepped intermediate region 98 is provided on the tip between the rear section 96 and the flange 94, and defines a cam that engages an element 100 of a contact switch 102 for opening and closing the switch when the stunner element is moved between the extended and retracted positions. The switch 102 is included in a circuit that powers a solenoid-actuated valve 104 secured to the handle of the apparatus. As described below, when the switch 102 is closed, the valve 104 moves to a first position in which fluid is delivered to the rear end of the cylinder through the passages 76, 80, and when the switch is opened, the valve moves to a second position in which fluid is delivered to the front end of the cylinder through the passages 82, 86 of the housing, and the channel 54 and passages 56, 58 of the plug 52.

The hydraulic fluid handling system includes a conventional hydraulic fluid reservoir 106, a feed line 108 extending between the reservoir and the apparatus, a pump 110 for delivering hydraulic fluid under pressure through the feed line to the apparatus, and a return line 112 extending between the apparatus and the reservoir for returning hydraulic fluid to the reservoir from the apparatus. The feed and return lines 108, 112 are connected to the apparatus through fittings provided at the lower end of the handle 16. An elongated passage communicates with each fitting and extends through the handle to the valve 104. When the valve is in the first position, with the switch 102 closed, the feed line 108 is communicated with the passages 76, 80 to feed hydraulic fluid under pressure to the rear end of the cylinder, and the return line 112 is communicated with the passages 82, 86 for returning fluid to the reservoir from the front end of the cylinder. When the valve 104 is in the second position, with the switch 102 open, the feed line 108 is communicated with the passages 82, 86 to feed hydraulic fluid under pressure to the front end of the cylinder, and the return line 112 is communicated with the passages 76, 80 for returning fluid to the reservoir 106 from the rear end of the cylinder.

A safety switch 114 is provided on the handle of the apparatus for controlling operation of the pump. The switch is a two-position switch that is biased open so that the switch must be manually depressed in order for power to be delivered to the pump. If the switch is released at any time, power to the pump is cut off and the pressure of fluid in the cylinder is relieved. A trigger 116 is mounted on the handle for pivotal movement between a released position in which the trigger allows the switch to open, and an actuated position in which the switch is closed against the bias of the spring.

A shuttle 118 is provided within the cylinder for moving the stunner element 12 to the cocked position when fluid under pressure is delivered to the front end of the cylinder. The shuttle includes an inner diameter sized for receipt of the stunner element and an outer diameter slightly smaller than the diameter of the intermediate region of the cylinder so that the shuttle is axially shiftable relative to both the stunner element and the cylinder. The inner diameter of the shuttle is stepped, presenting a relatively large diameter rear end section 120 having a diameter slightly greater than the enlarged diameter of the rear end of the stunner element. The shuttle functions as a piston within the cylinder, moving forward against the plug 52 when fluid under pressure is delivered to the rear end of the cylinder, and moving rearward when fluid under pressure is delivered to the front end of the cylinder.

The biasing means includes the cup-shaped end cap 24, which defines a cylinder, and a piston 122 that is received in the cylinder and divides the cylinder into two separate regions 124, 126. The region 126 forward of the piston extends between the piston and the hub 72, and forms a part of the cylinder of the apparatus within which hydraulic fluid is maintained under pressure. The region 124 to the rear of the piston is isolated from the forward region, and is filled with air under pressure. As mentioned, the orifice 66 in the end cap may be used to replenish or vary the pressure of the air in the end cap to adjust the force exerted by the biasing means on the hydraulic fluid in the cylinder.

To initiate firing of the apparatus from the position shown in FIG. 1, the user first depresses the safety trigger 116, energizing the pump to deliver fluid under pressure to the apparatus. Because the stunner element 12 is in the seated, cocked position, the switch 102 is closed and the Valve is moved to the first position. As mentioned, in this position of the valve 104, fluid is delivered under pressure to the rear end of the cylinder, moving the shuttle 118 forward against the annular plug 52 and pressurizing the cylinder. Because the front region 126 of the end cap 24 communicates with the cylinder, fluid under pressure pushes the piston 122 rearward into the cap, compressing the air in the rear region 124 to the same pressure as the cylinder.

Figure 2:
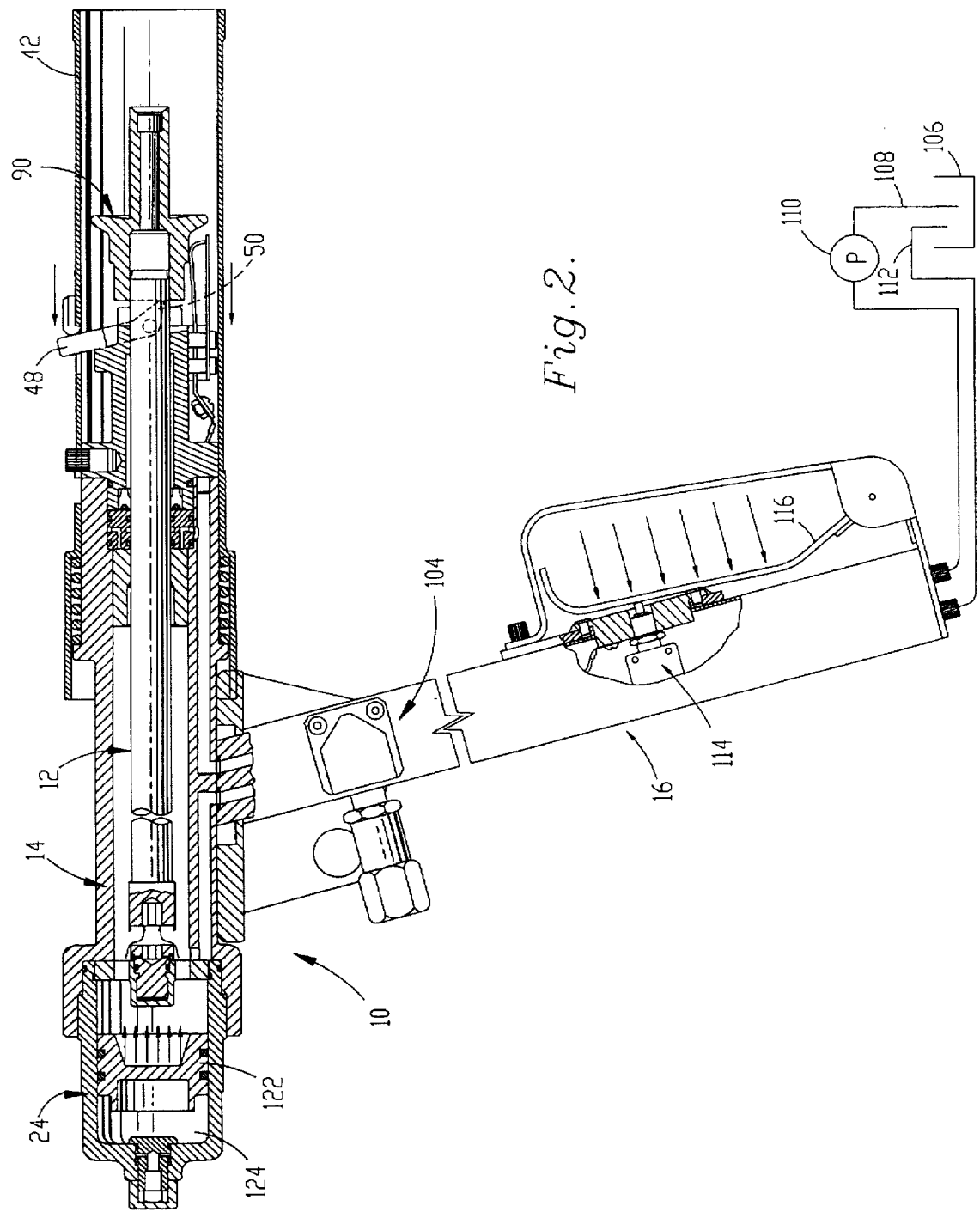
FIG. 2 is a fragmentary side elevational view, partly in section, of the stunner apparatus, illustrating the stunner element immediately after initiation of movement of the element toward a fired position.

While holding the safety trigger down, the user then places the nose element 42 against the skull of an animal to be slaughtered so that the nose element shifts axially on the apparatus to the retracted position illustrated in FIG. 2. Movement of the nose element forces the lever 48 to pivot about the pivot axis so that the shoulders 50 of the lever engage the rear end face of the stunner element tip 90, camming the stunner element forward and unsealing the rear seat of the element from the seat defined by the hub. Immediately upon becoming unseated, the stunner element is forced from the cylinder toward the extended position by the unbalanced fluid pressure acting on the rear end of the element.

As the stunner element 12 is pushed from the cylinder, the space occupied by the stunner element is vacated. Normally, this would relieve the hydraulic pressure within the cylinder. However, the biasing means maintains the hydraulic pressure so that the stunner element is pushed completely to the extended position under pressure. Specifically, as the pressure of the hydraulic fluid is relieved, the compressed air in the rear region 124 of the end cap 24 forces the piston 122 toward the cylinder to equalize the pressure across the piston. Thus, pressure of the hydraulic fluid in the cylinder is maintained as is the force exerted on the stunner element.

The volume of the cylinder that is displaced by the piston when the rear end of the cylinder is pressurized with hydraulic fluid is preferably equal to the volume of the cylinder that is occupied by the stunner element in the cocked position. By providing this construction, the piston moves forward in the cylinder upon firing of the stunner element to reduce the volume of the cylinder by an amount equal to the volume vacated by the stunner element, thus maintaining the pressure of the hydraulic fluid in the cylinder.

As shown in FIG. 3, as the stunner element reaches the extended position, the enlarged rear end of the element enters the rear end section 120 of the shuttle 118. The hydraulic fluid within the stepped region dampens the forward movement of the shuttle and stops the element at the end of its stroke. When the stunner element is fired, the switch element 100 rides off of the cam defined by the intermediate region 98 of the tip 90, opening the switch 102 and moving the valve 104 to the second position. As mentioned, in this position, the second valve directs hydraulic fluid under pressure to the front end of the cylinder and directs fluid from the rear end of the cylinder to the reservoir. Because the speed at which hydraulic fluid is redirected to the front of the cylinder is relatively slow compared to the firing of the element, movement of the valve immediately upon opening of the switch does not adversely affect the force with which the element is fired.

However, subsequent to firing, the hydraulic fluid delivered to the front end of the cylinder forces the shuttle 118 rearward, as shown in FIG. 4. Because the shuttle engages the enlarged diameter rear end of the element 12, the element is drawn with the shuttle to the back end of the cylinder and seats against the hub. A radially extending orifice 128 is provided in the hub for allowing hydraulic fluid between the hub and the stunner element to escape from between the hub and stunner element seats, allowing the element 12 to seal against the hub 72. An annular, elastomeric O-ring 130 is provided on the hub and covers the radially extending orifice so that hydraulic fluid is allowed to pass outward through the orifice but is not permitted to flow inward. Thus, the O-ring 130 functions as a one-way valve that relieves pressure between the seats but does not allow pressure to enter the orifice from the cylinder. Preferably, an annular channel is formed in the hub for receiving the O-ring 130, maintaining the O-ring in position over the orifice.

At the same time that the stunner element 12 is returned to the cocked position, the apparatus is withdrawn from the skull of the animal, allowing the nose element 42 to be biased by the spring 34 to the extended position, and relieving pressure from the lever 48 so that the stunner element is allowed to move completely to the cocked position. Only by maintaining the safety trigger 116 depressed is the stunner element returned to the cocked position, since letting go of the trigger opens the switch 114, turning the pump off. Once the stunner element is returned to the cocked position by the shuttle, the switch element 100 rides onto the intermediate region 98 of the tip, closing the switch 102 and moving the valve 104 to the first position so that hydraulic fluid under pressure is again delivered to the rear end of the cylinder. This pressure returns the shuttle 118 to the front end of the cylinder and recharges the biasing means, as shown in FIG. 1, and the apparatus is again ready to be fired. If at any time the safety trigger 116 is released, the pump is turned off and the pressure within the cylinder is relieved. Thus, the apparatus cannot be fired unless the safety trigger is depressed at the same time that the nose element is pushed against the skull of the animal.

Although the present invention has been described with reference to the preferred embodiment, it is noted that equivalents may be employed and substitution made herein without departing from the scope of the invention as recited in the claims.

What is claimed is:

1. A hydraulic stunner apparatus comprising:

a housing defining a cylinder having a first closed end and a second open end, and including a seat disposed within the cylinder;

an elongated stunner element received in and closing off the open end of the cylinder, the stunner element including a first end disposed within the cylinder and an opposed second end disposed outside the open end of the cylinder, the stunner element being movable between a cocked position in which the first end of the element is sealed against the seat, and a fired position in which the first end of the element is unseated and the stunner element is extended relative to the cylinder;

a pump means for directing hydraulic fluid into the cylinder to pressurize the cylinder; and an actuating means for unseating the stunner element from the cocked position to initiate movement of the element to the fired position, the stunner element, when removed from the seat, being forced to the fired position by hydraulic pressure acting on the first end of the element.

2. A hydraulic stunner apparatus comprising:

a housing defining a cylinder having a first closed end and a second open end, and including a seat disposed within the cylinder;

an elongated stunner element received in and closing off the open end of the cylinder, the stunner element including a first end disposed within the cylinder and an opposed second end disposed outside the open end of the cylinder, the stunner element being movable between a cocked position in which the first end of the element is sealed against the seat, and a fired position in which the first end of the element is unseated and the stunner element relative to the cylinder;

a pump means for directing hydraulic fluid into the cylinder to pressurize the cylinder;

an actuating means for unseating the stunner element from the cocked position to initiate movement of the element to the fired position, the stunner element, when removed from the seat, being forced to the fired position by hydraulic pressure acting on the first end of the element; and a compressible biasing means for maintaining the hydraulic pressure within the cylinder upon separation of the stunner element from the seat and movement of the stunner element toward the extended position, the biasing means being compressed by the hydraulic fluid directed into the cylinder by the pump means, the biasing means occupying a volume of the cylinder that is variable as the biasing means is compressed, the change in the volume occupied by the biasing means being substantially equal to the volume within the cylinder that is occupied by the stunner element in the cocked position so that the pressure of the hydraulic fluid in the cylinder is maintained on the stunner element as the element is moved to the fired position.

3. A hydraulic stunner apparatus as recited in claim 2, wherein the biasing means includes a closed space filled with a compressible fluid, and an interface extending between and separating the closed space and the cylinder, the interface being movable within the cylinder and the closed space to balance the pressure across the interface.

4. A hydraulic stunner apparatus as recited in claim 3, wherein the closed space is defined by an end cap that is received on the housing and closes off the first end of the cylinder, the interface including a piston supported for axial shifting movement within the end cap.

5. A hydraulic stunner apparatus as recited in claim 1, further comprising a return means for returning the stunner element to the cocked position subsequent to operation of the actuating means.

6. A hydraulic stunner apparatus comprising:

a housing defining a cylinder having a first closed end and a second open end, and including a seat disposed within the cylinder;

an elongated stunner element received in and closing off the open end of the cylinder, the stunner element including first end disposed within the cylinder and an opposed second end disposed outside the open end of the cylinder, the stunner element being movable between a cocked position in which the first end of the element is sealed against the seat, and a fired position in which the first end of the element is unseated and the stunner element is extended relative to the cylinder;

a pump means for directing hydraulic fluid into the cylinder pressurize the cylinder;

an actuating means for unseating the stunner element from the cocked position to initiate movement of the element to the fired position, the stunner element, when removed from the seat, being forced to the fired position by hydraulic pressure acting on the first end of the element; and a return means for returning the stunner element to the cocked position subsequent to operation of the actuating means, said return means including an annular shuttle received on the stunner element within the cylinder, the shuttle being shiftable axially relative to the stunner element and the cylinder, and dividing the cylinder into two regions that are isolated from one another, the housing including a first fluid passage communicating with the cylinder region adjacent the first end and a second fluid passage communicating with the cylinder region adjacent the second end, the stunner element including a stepped section sized for engagement by the shuttle so that when hydraulic fluid is directed through the second passage, the shuttle engages the stepped section and moves the stunner element to the cocked position.

7. A hydraulic stunner apparatus as recited in claim 6, wherein the return means includes a valve that is disposed between the pump means and the first and second passages and is movable between a first position in which hydraulic fluid is directed to the first passage and a second position in which hydraulic fluid is directed to the second passage, and a valve actuating means for moving the valve to the second position when the stunner element is fired.

8. A hydraulic stunner apparatus comprising:

a housing defining a cylinder having a first closed end and a second open end, and including a seat disposed within the cylinder;

an elongated stunner element received in and closing off the open end of the cylinder, the stunner element including a first end disposed within the cylinder and an opposed second end disposed outside the open end of the cylinder, the stunner element being movable between a cocked position in which the first end of the element is sealed against the seat, and a fired position in which the first end of the element is unseated and the stunner element is extended relative to the cylinder;

a pump means for directing hydraulic fluid into the cylinder to pressurize the cylinder; and an actuating means for unseating the stunner element from the cocked position to initiate movement of the element to the fired position, the stunner element, when removed from the seat, being forced to the fired position by hydraulic pressure acting on the first end of the element, said pump means including a pump, a switch on the housing for energizing the pump, the switch being movable between an open position and a closed position, and including a spring for biasing the switch toward the open position so that the pump is only energized while the switch is held in the closed position against the force of the spring.

9. A hydraulic stunner apparatus as recited in claim 1, wherein the actuating means includes a lever supported on the housing for pivotal movement and a means for pivoting the lever to engage the stunner element and unseat the element from the cocked position.

10. A hydraulic stunner apparatus as recited in claim 9, wherein the means for pivoting the lever includes a nose element that is supported on the housing for axial shifting movement between an extended position in which the lever is out of engagement with the stunner element and a retracted position in which the lever is engaged with the stunner element and unseats the element from the cocked position.

11. A hydraulic stunner apparatus as recited in claim 10, further comprising a spring supported between the housing and the nose element for biasing the nose element toward the extended position.

* * * * *